(12) United States Patent
Case et al.

(10) Patent No.: US 9,316,734 B2
(45) Date of Patent: Apr. 19, 2016

(54) FREE-HAND SCANNING AND IMAGING

(71) Applicants: Joseph T. Case, Wildwood, MO (US); Mohammad Tayeb Ghasr, Rolla, MO (US); Reza Zoughi, Wildwood, MO (US)

(72) Inventors: Joseph T. Case, Wildwood, MO (US); Mohammad Tayeb Ghasr, Rolla, MO (US); Reza Zoughi, Wildwood, MO (US)

(73) Assignee: The Curators of the University of Missouri, Columbia, MO (US)

( * ) Notice: Subject to any disclaimer, the term of this patent is extended or adjusted under 35 U.S.C. 154(b) by 318 days.

(21) Appl. No.: 14/058,395

(22) Filed: Oct. 21, 2013

(65) Prior Publication Data

US 2014/0111374 A1    Apr. 24, 2014

Related U.S. Application Data

(60) Provisional application No. 61/715,894, filed on Oct. 19, 2012.

(51) Int. Cl.
| | |
|---|---|
| *G01S 13/90* | (2006.01) |
| *G01S 13/88* | (2006.01) |
| *G01V 3/12* | (2006.01) |
| *G01S 15/89* | (2006.01) |

(52) U.S. Cl.
CPC ............ *G01S 13/9035* (2013.01); *G01S 13/90* (2013.01); *G01S 13/88* (2013.01); *G01S 13/885* (2013.01); *G01S 13/887* (2013.01); *G01S 13/888* (2013.01); *G01S 15/8904* (2013.01); *G01V 3/12* (2013.01)

(58) Field of Classification Search
CPC ..... G01S 13/88; G01S 13/885; G01S 13/887; G01S 13/888; G01S 13/90–13/9094; G01V 3/12

USPC .......... 342/22, 25 R, 25 A, 25 B, 25 C, 25 D, 342/25 E, 25 F; 324/323, 332, 335, 337, 324/76.19, 76.21, 76.22
See application file for complete search history.

(56) References Cited

U.S. PATENT DOCUMENTS

| | | | | |
|---|---|---|---|---|
| 3,573,446 | A * | 4/1971 | Bergland ............... | G06F 17/142 324/76.21 |
| 3,713,156 | A * | 1/1973 | Pothier ..................... | G01S 7/04 342/179 |
| 4,271,389 | A * | 6/1981 | Jacobi ...................... | A61B 5/05 324/638 |
| 5,357,253 | A * | 10/1994 | Van Etten ............. | G01S 7/4021 324/337 |
| 5,463,397 | A * | 10/1995 | Frankot ............... | G01S 13/9023 342/194 |
| 5,557,277 | A * | 9/1996 | Tricoles .................. | G01S 13/36 324/326 |
| 5,592,170 | A * | 1/1997 | Price ...................... | F41H 11/16 342/22 |
| 5,623,928 | A * | 4/1997 | Wright ................ | G01S 7/52023 600/447 |

(Continued)

OTHER PUBLICATIONS

D. M. Sheen, D. L. McMakin, and T. E. Hall, "Three-Dimensional Millimeter-Wave Imaging for Concealed Weapon Detection," IEEE Trans. Microwave Theory Tech., vol. 49, No. 9, Sep. 2001, pp. 1581-1592.

(Continued)

*Primary Examiner* — Peter Bythrow
(74) *Attorney, Agent, or Firm* — Senniger Powers LLP

(57) ABSTRACT

Wideband synthetic aperture radar (SAR) imaging. A probe transmits a signal through its aperture incident to an object located in a medium of interest remotely from the probe. The probe receives through the aperture a plurality of nonuniformly sampled reflected signals from the object as the probe moves in a measurement plane located a predetermined distance from the object. A processor executes a SAR-based reconstruction algorithm to generate an image.

23 Claims, 9 Drawing Sheets

(56) References Cited

U.S. PATENT DOCUMENTS

| | | | | |
|---|---|---|---|---|
| 5,644,314 | A * | 7/1997 | Ahmad | G01S 7/412 342/192 |
| 5,673,050 | A * | 9/1997 | Moussally | G01S 13/0209 342/22 |
| 5,748,003 | A * | 5/1998 | Zoughi | G01B 15/00 324/237 |
| 5,796,363 | A * | 8/1998 | Mast | G01S 7/292 342/179 |
| 5,829,437 | A * | 11/1998 | Bridges | A61B 5/05 324/638 |
| 5,835,054 | A * | 11/1998 | Warhus | G01S 7/292 342/179 |
| 6,061,589 | A * | 5/2000 | Bridges | A61B 5/05 600/430 |
| 6,424,287 | B1 * | 7/2002 | Doerry | G01S 13/9023 342/25 R |
| 6,646,593 | B1 * | 11/2003 | Garren | G01S 13/9035 342/159 |
| 7,259,715 | B1 * | 8/2007 | Garren | G01S 13/003 342/159 |
| 7,340,292 | B2 * | 3/2008 | Li | A61B 5/05 600/430 |
| 7,397,418 | B1 * | 7/2008 | Doerry | G01S 13/9011 342/196 |
| 7,567,198 | B2 * | 7/2009 | Smith | G06T 17/05 342/192 |
| 8,499,634 | B2 * | 8/2013 | Urbano | A61B 8/4472 600/446 |
| 2002/0175849 | A1 * | 11/2002 | Arndt | F41H 11/12 342/22 |
| 2006/0197697 | A1 * | 9/2006 | Nagata | G01R 31/2884 342/22 |
| 2007/0205936 | A1 * | 9/2007 | McMakin | G01S 7/026 342/22 |
| 2007/0293752 | A1 * | 12/2007 | Simpkin | A61B 5/0091 600/407 |
| 2009/0021423 | A1 * | 1/2009 | Cheng | G01S 7/003 342/25 A |
| 2009/0033549 | A1 * | 2/2009 | Jin | G01S 13/9035 342/25 F |
| 2009/0222221 | A1 * | 9/2009 | Buyukozturk | G01S 7/41 702/35 |
| 2009/0262005 | A1 * | 10/2009 | McNeill | G01S 7/35 342/22 |
| 2009/0262006 | A1 * | 10/2009 | McNeill | G01S 7/35 342/22 |
| 2009/0309786 | A1 * | 12/2009 | Stolpman | A61B 5/0507 342/25 A |
| 2010/0033709 | A1 * | 2/2010 | Lampin | H01Q 1/38 356/51 |
| 2010/0045514 | A1 * | 2/2010 | Bartscher | G01S 7/03 342/25 R |
| 2010/0141508 | A1 * | 6/2010 | Nguyen | G01S 13/90 342/25 F |
| 2010/0176789 | A1 * | 7/2010 | Zoughi | G01R 27/28 324/76.13 |
| 2010/0321235 | A1 * | 12/2010 | Vossiek | G01S 13/9029 342/25 A |
| 2011/0163912 | A1 * | 7/2011 | Ranney | G01S 13/90 342/25 F |
| 2012/0250748 | A1 * | 10/2012 | Nguyen | G01S 13/90 375/224 |
| 2013/0129253 | A1 * | 5/2013 | Moate | G01S 13/90 382/278 |
| 2014/0077989 | A1 * | 3/2014 | Healy, Jr. | G01S 13/90 342/25 F |
| 2014/0091965 | A1 * | 4/2014 | Sheen | G01S 13/90 342/25 A |
| 2014/0232590 | A1 * | 8/2014 | Jin | G01S 13/5242 342/25 F |

OTHER PUBLICATIONS

M. Soumekh, "Bistatic Synthetic Aperture Radar Inversion with Application in Dynamic Object Imaging," IEEE Trans. Signal Processing, vol. 39, No. 9, Sep. 1991, pp. 2044-2055.

J. M. Lopez-Sanchez and J. Fortuny-Guasch, "3-D Radar Imaging Using Range Migration Techniques," IEEE Trans. Antennas Propag., vol. 48, No. 5, May 2000, pp. 728-737.

J. Keiner, S. Kunis, and D. Potts, "Using NFFT 3—a software library for various nonequispaced fast Fourier transforms," ACM Trans. Math. Softw., vol. V, No. N, M, 2008, pp. 1-23.

I. Dutt and V. Rokhlin, "Fast Fourier Transforms for Nonequispaced Data," SIAM J. Sci. Comput., vol. 14, No. 6, Nov. 1993, pp. 1368-1393.

B. Subiza, E. Gimeno-Nieves, J. M. Lopez-Sanchez, and J. Fortuny-Guasch, "An Approach to SAR Imaging by Means of Non-Uniform FFTs," IEEE Int. Proc. Geosci. and Remote Sensing Symp., vol. 6, Jul. 2003, pp. 4089-4091.

J. Song, Q. H. Liu, K. Kim, and W. R. Scott, "High-Resolution 3-D Radar Imaging through Nonuniform Fast Fourier Transform (NUFFT)," Commun. Comput. Phys., vol. 1, No. 1, Feb. 2006, pp. 176-191.

J.T. Case, M.T. Ghasr, R. Zoughi, "Optimum Two-Dimensional Uniform Spatial Sampling for Microwave SAR-Based NDE Imaging System," IEEE Trans. Instrumentation and Measurement, vol. 60, No. 12, Dec. 2011, pp. 3806-3815.

H. Hahn and H-O Peitgen, "The Skull Stripping Problem in MRI Solved by a Single 3D Watershed Transform," Proc. MICCAI, vol. 1935, 2000, pp. 134-143.

J.C. Yoo and Y.S. Kim, "A Reverse-SAR (R-SAR) Algorithm for the Detection of Targets Buried in Ground Clutter," Microwave and Optical Technology Letters, vol. 28, No. 2, 2001, pp. 121-126.

Ghasr, M. T.; Abou-Khousa, M. A.; Kharkovsky, S.; Zoughi, R.; Pommerenke, D.; , "Portable Real-Time Microwave Camera at 24 GHz," IEEE Trans. Antennas Propag., vol. 60, No. 2, Feb. 2012, pp. 1114-1125.

K. Grochenig and T. Strohmer, "Numerical and Theoretical Aspects of Nonuniform Sampling of Band-Limited Images," Nonuniform Sampling: Theory and Practice, New York, NY, Kluwer Academic/Plenum Publishers, 2001, pp. 283-324.

A.V. Oppenheim and R.W. Schafer, Discrete-Time Signal Processing, Third Edition, Upper Saddle River, NJ, Prentice Hall, 2010, pp. 48-54.

F.R. Preparata and M. I. Shamos, Computational Geometry: An Introduction, New York, NY, Springer-Verlag, 1985, pp. 234-248.

J. W. Goodman, Introduction to Fourier Optics, 3rd ed., Englewood, CO: Roberts & Company Publishers, 2005, pp. 6-7.

G. Cumming and F. H. Wong, Digital Processing of Synthetic Aperture Radar Data: Algorithms and Implementation, Norwood, MA, Artech House, 2005, pp. 323-367.

* cited by examiner

FREE-HAND SCANNING AND IMAGING

BACKGROUND

Microwave and millimeter wave wide-band three-dimensional (3-D) synthetic aperture radar (SAR)-based imaging techniques have demonstrated tremendous usefulness for nondestructive evaluation (NDE) applications for industrial, scientific, and medical imaging. For example, such techniques are particularly useful for 3-D imaging of low contrast dielectric media and in security applications. Typically, measurements are performed by raster scanning a probe on a uniform 2-D grid. To achieve optimum resolution and image quality, however, a large quantity of measurements must be obtained to image even a small area. Unfortunately, conventional scanning techniques require a relatively long time to scan and obtain an image. For example, the time needed to perform the measurements typically ranges from tens of minutes to several hours depending on the size of structure being imaged and the operating frequency. As a result, nondestructive testing of large and critical structures (e.g., aircraft, bridges, space vehicles and the like) cannot utilize real-time imaging.

A method to form SAR images as quickly as possible is desired.

SUMMARY

Briefly, aspects of the invention permit SAR images to be quickly generated while maintaining an acceptable level of resolution. One such way to achieve this is to manually nonuniformly sample wide-band reflection measurement data over the sample under test while simultaneously producing a SAR image from the data as it is gathered. This enables the production of complete SAR images using only a fraction of the required measured data because the user may intelligently stop the measurement once an image is deemed satisfactory. By reducing the amount of measured data, there is a commensurate time savings achieved in data acquisition. To assist the user during the data acquisition process, a fast 3D wide-band SAR algorithm that produces 3D SAR images in real-time is needed to inform the user in real-time as to the progress of the scan. Furthermore, a reconstruction algorithm used to post-process the data for the objective of optimization resulting in high quality images with, for example, considerably lower background noise/clutter is needed.

In an aspect, a wideband synthetic aperture radar (SAR) imaging system includes a probe that has an aperture through which a signal, such as an electromagnetic signal, is transmitted incident to an object located in a medium of interest remotely from the probe. Also, the probe receives through the aperture a plurality of nonuniformly sampled reflected signals from the object as the probe moves in a measurement plane located a predetermined distance from the object. The system also includes a memory and a processor. The memory stores measurement data representative of the reflected signals collected by the probe and the processor executes a plurality of computer-executable instructions for a SAR-based reconstruction algorithm. The instructions include instructions for performing a spectral estimation based on the measurement data, instructions for transforming a frequency component of the spectral estimation as a function of the medium of interest, and instructions for obtaining a three-dimensional SAR image from the transformed spectral estimation data using Fourier transforms. The system further includes a display responsive to the processor for presenting the three-dimensional SAR image to a user.

A method embodying aspects of the invention generates a three dimensional image of a specimen under test (SUT). The method includes transmitting, via a probe, a signal within a predetermined operating bandwidth and tracking nonuniform two-dimensional movement of the probe within a measurement plane remote from the SUT. In addition, the method includes receiving, via the probe, signals reflected from the SUT during the movement of the probe and storing reflection coefficient data based on the reflected signals as distributed measurement positions within the measurement plane by recording the signals at discrete frequencies throughout the operating bandwidth. In a further step, the method includes processing the stored data into a wide band, three dimensional (3-D) synthetic aperture image by implementing a 3-D SAR algorithm. The method also includes displaying the 3-D SAR image to a user in real-time; further processing the 3-D SAR image to perform an objective optimization and further displaying the 3-D SAR image having reduced errors to the user.

In another aspect, a wideband synthetic aperture radar (SAR) imaging system comprises a signal source, a transceiver antenna coupled to the signal source, a memory, a processor, and a display. The signal source generates a signal with a predetermined operating bandwidth that is transmitted through an aperture of the antenna. The transmitted signal is incident to an object located in a medium and the antenna receives a plurality of nonuniformly sampled reflected signals from the object through the aperture as the antenna moves nonuniformly in a plane located a predetermined distance from the object. The memory stores signal data comprising nonuniformly sampled reflected signals collected at the aperture and the processor executes a plurality of computer-executable instructions for a real-time, post-processing, reconstruction algorithm. The instructions include estimating a two-dimensional spatial spectrum based on the signal data to provide a uniformly sampled spectrum, estimating the uniformly sampled spectrum to remove or minimize image artifacts, reconstructing uniformly sampled data from nonuniformly sampled data to remove or minimize image artifacts, forming a SAR image of the object from the estimated uniform spectrum, dividing the reconstructed SAR image into a plurality of segments, applying a R-SAR transform to each of the segments, and filtering and reconstructing the data for each segment and summing each filtered segment. The display presents the three-dimensional SAR image in real-time to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

For a better understanding of the aforementioned aspects of the invention as well as additional aspects and embodiments thereof, reference should be made to the Detailed Description below, in conjunction with the following drawings in which like reference numerals refer to corresponding parts throughout the figures.

DETAILED DESCRIPTION

In general, in one embodiment, a unique system for imaging a scene of interest (e.g., an object) is described. To best reconstruct a complex signal from all targets within a scene of interest (e.g., an object) from nonuniform measurement samples occurs in two parts. In a first part of the imaging process, a two-dimensional (2-D) positioning system is utilized to monitor the movements of an imaging probe as the imaging probe performs a scan in a plane. A processor tracks the position of a probe as the probe scans and collects data. The scanning process is performed free-hand by a user (who is holding and using the imaging probe) and utilizes user feed-back from the real-time SAR image formation as to whether to continue or terminate the scanning process.

A second part of the imaging process includes post-processing where the collected randomly positioned measurements are processed to reconstruct the 3-D SAR image with optimum resolution and signal-to-noise ratio (SNR). For example, PP2 forms an intermediate 3-D SAR image and then the SAR image is segmented (i.e., the data is transformed temporarily from the data domain to the image domain). These segments are then individually transformed from the image domain to the measurement domain, where each image segment is represented as partial data. This transform is performed using the unique 3-D Reverse-SAR (R-SAR) transform. The partial data are individually and optimally reconstructed according to their own spatial bandwidth of the partial data using an optimization process, such as an error minimization process (e.g., minimizing residual error). The multi-band partial data segments are subsequently recombined and processed using a 3-D SAR processor to produce the final SAR image.

Figure 1:
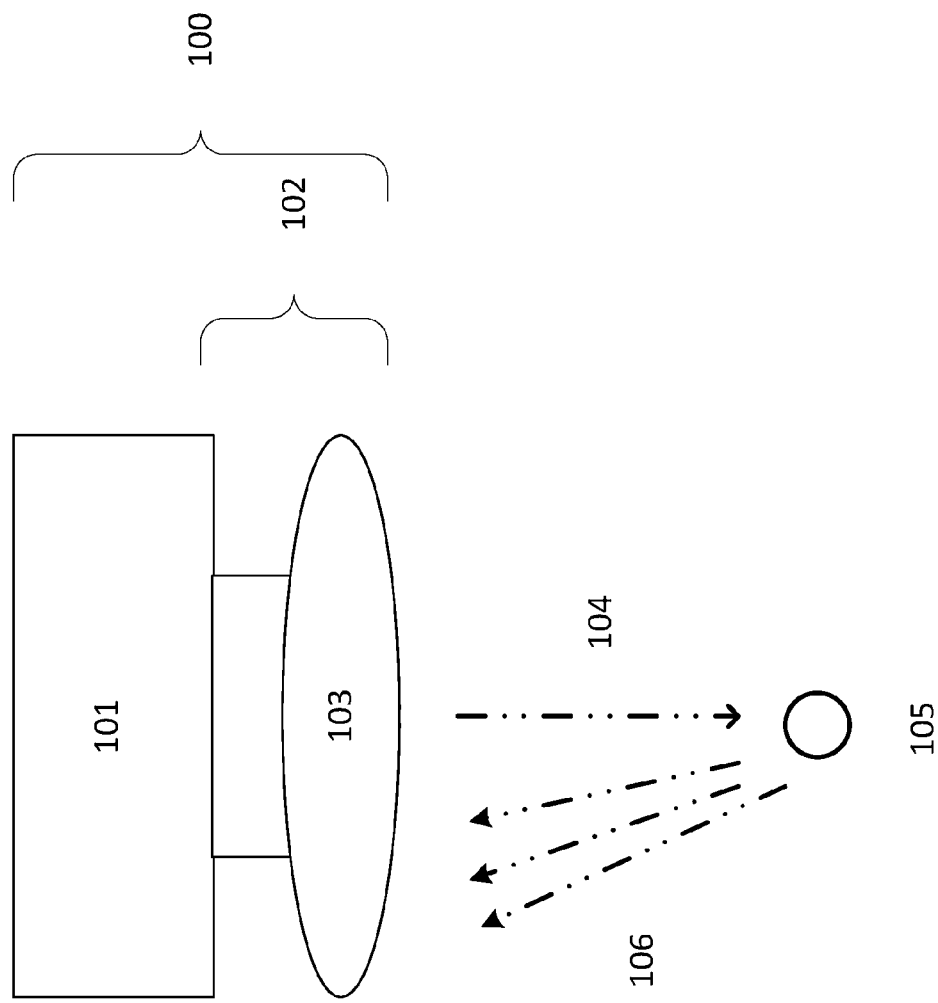
FIG. 1 is a diagram illustrating an exemplary depiction in accordance with one embodiment of the invention.

FIG. 1 illustrates a general depiction of an embodiment of the invention. The imaging probe 100 comprises a signal source 101 and an antenna 102 for sending and/or receiving electromagnetic waves. In the illustrated embodiment, the antenna 102 is a transceiver antenna having an aperture 103.

The signal source 101 contains a processor which executes the various data collection and data processing steps necessary for operation of the invention, as well as a display which shows a 3-D SAR image to a user. The imaging probe 100 transmits a signal with a wavelength 104 between 1 mm and 1 um, which reaches an object in the scene of interest 105. As the imaging probe moves in a nonuniform manner in a two-dimensional plane, the reflected signals 106 are nonuniformly sampled by the transceiver antenna 102.

Table 1 provides a description for the different SAR processors that are discussed throughout this document. For example, the RT1 processor provides a means to simplify real-time data management by including a spectral estimation step consisting of a fast Fourier transform (FFT) on data which is digitally stored corresponding to the nearest uniform grid point. Alternatively, the RT2 processor performs a FFT on the raw sample points, without assigning the points to a uniform grid. Both processors only take a fraction of a second to produce and render an SAR image, enabling quick inspection of a specimen under test (SUT).

Improved spectral estimation techniques require further processing time, but reduce undesirable aspects of SAR images inherent in processors such as RT1 and RT2, such as uneven brightness and image artifacts. The PP1 processor reduces these undesirable aspects by generating a spectral estimation which decreases the residual error between the original data and the inverse 2D nonuniform fast Fourier transform (NUFFT) of the estimate of the spectrum. Because of this step, this processor is suitable for rendering a SAR image of higher quality than the RT1 and RT2 processors.

A final method of spectral estimation, exemplified in processors PP2 and PP3, is suitable for providing vastly improved SAR images in situations where the objects sought to be scanned within the SUT lie at different distances from the measurement plane. PP2 renders an improved image by obtaining an intermediate SAR image, then comparing that image with the final processed result to reduce error. PP3, on the other hand, is suitable for producing the most improved SAR images. By comparing a component of the forward SAR algorithm with a component of the reverse SAR algorithm during spectral estimation, and designating each sample of the spectrum its own bandwidth, this processor not only produces the most desirable SAR images when multiple objects lie at different distances from the measurement plane, but also performs this task with less computational complexity than previously known.

TABLE 1

| Abbrev. | SAR Processor Name | Description |
| --- | --- | --- |
| RT1 | Real-time processor using FFT to form spectrum | Nonuniformly sampled points are assigned coordinates aligned to a grid |
| RT2 | Real-time processor using NFFT to form spectrum | Nonuniform sampled points are used without alignment |
| PP1 | Single Spatial Bandwidth Spectral Estimation | Spectral estimation/data reconstruction is performed using a single spatial bandwidth |
| PP2 | Coarsely Segmented Multiple Spatial Bandwidth Spectral Estimation | Spectral estimation/data reconstruction is performed using a spatial bandwidth for each segment of a preliminary image |
| PP3 | Fine Segmented Multiple Spatial Bandwidth Spectral Estimation | Spectral estimation/data reconstruction is performed using a spatial bandwidth unique for every depth in the image. A Fourier-based transform based upon SAR and R-SAR is used in the spectral estimation process. |

Figure 2:
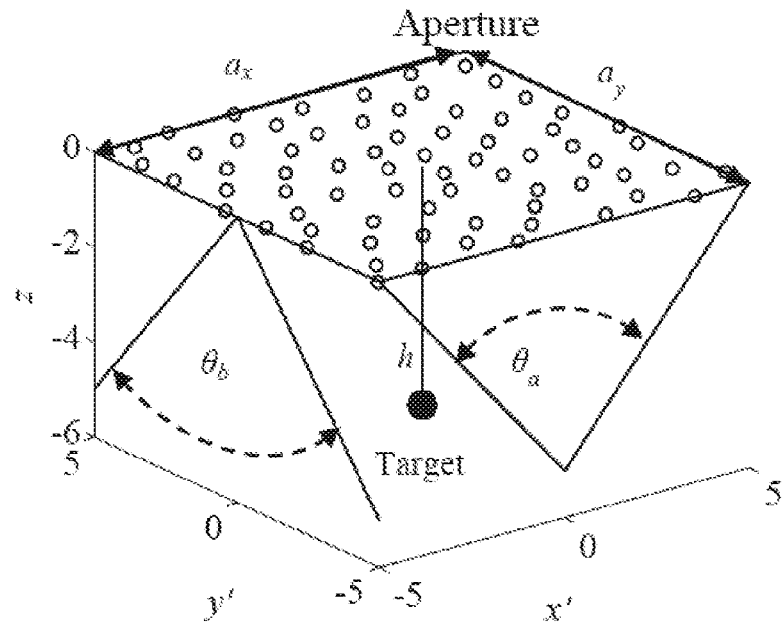
FIG. 2 is a diagram depicting the implementation of a nonuniform scanning system in accordance with one embodiment of the invention.

FIG. 2 illustrates a schematic of a measurement setup for microwave or millimeter wave imaging according to an embodiment of the invention. It is to be understood that aspects of the invention may be applied to signals of other modalities, such as ultrasonic waves or acoustic energy. Measurements are performed at $N_{xy}$ nonuniform positions P 200 selected on the scanning area 205, which are represented by multiple small circles on a rectangular region bounded by dimensions $a_x$ and $a_y$ at a distance h 210 above a target 215. This area may also hereafter be referred to as an aperture. Individual positions in the matrix P 200 consist of rows $p_n = (x'_n, y'_n, 0) | n = 1 \ldots N_{xy}$. Measurements consist of recording the complex microwave reflection coefficient (or scattered electric field distribution) as measured by a transceiver antenna pointed downwards (not shown) with a certain beamwidth 220 ($\sigma_b$) at stepped (e.g., discrete) frequencies (f) in the operating bandwidth. Given the location of the target 215, the angle subtending the aperture $\sigma_a$ is 225. Measurements may be conducted by scanning a single transceiver (e.g., open-ended waveguide probe) on a path through positions P 200 corresponding to the shortest path or the measurements may be collected manually from user movements. However, measurements may also be performed by an imaging array that consists of $N_{xy}$ small transceiving antennas located at P 200. Typically this would be considered a real aperture, whereas scattered electric field measurements obtained using a single scanning transceiver is typically considered a synthetic aperture. Volumetric (e.g., wide-band) SAR images are then produced from the scattered electric field measurements. The SAR images are uniformly and highly sampled compared to typical SAR applications. The microwave SAR-based NDE imaging system is unique because the aperture is relatively small, the targets can be relatively close to the aperture, and the positions P 200 are precisely known.

Figure 3:
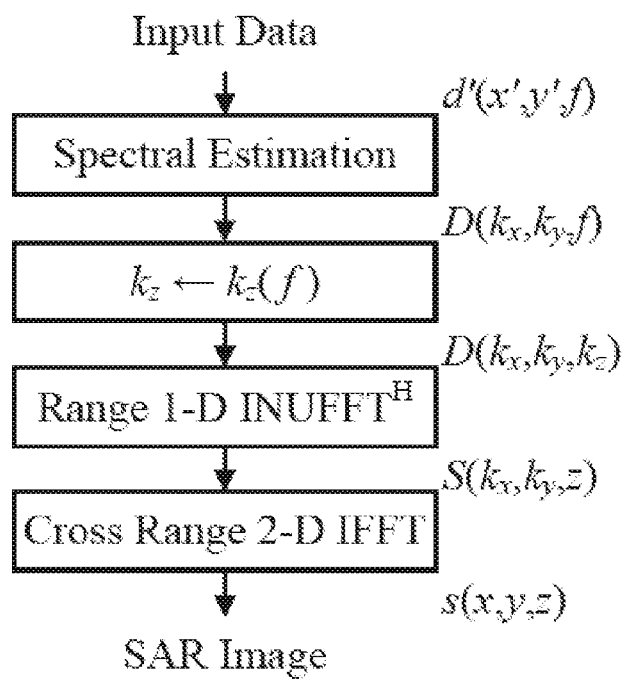
FIG. 3 is a block diagram illustrating the operation of an exemplary synthetic aperture radar (SAR) algorithm in accordance with one embodiment of the invention.

FIG. 3 illustrates the 3-D SAR algorithm that uses the ω-k algorithm, which is known in the art, with a one dimensional (1-D) nonuniform Fast Fourier Transform (FFT). The 3-D SAR algorithm first transforms the spatial data sampled over the aperture, d'(x',y',f) 300, to its spectral decomposition, $D(k_x, k_y, f)$ 305. This corresponds to the block labeled "Spectral Estimation" 310. Many algorithms exist that may be used to reconstruct the measured signal from nonuniform samples; thereby, providing different spectral estimates. Therefore in other embodiments, other algorithms can be used to provide a uniformly sampled spectrum from nonuniform spatial samples, (i.e., $k_x$ and $k_y$ are uniformly sampled and dependent upon uniform image sample spacing $\Delta x$ and $\Delta y$, respectively). Thus, the spectrum is bounded by the high uniform sampling density of the image (i.e., $|k_x| \leq \pi/\Delta x$ and $|k_y| \leq \pi/\Delta y$ for $\Delta x = \Delta y \ll \lambda$).

After spectral estimation 310, the next step involves determining the wavenumber ($k_z$), which is related to a frequency, f, by the following dispersion relation abbreviated as $k_z \leftarrow k_z(f)$ 315:

$$k_z = \sqrt{\left(\frac{2\alpha\pi f}{v}\right)^2 - k_x^2 - k_y^2} \quad (1)$$

where v is the speed of light in the medium. The term α is equal to a value of one for bistatic measurements, and term α is equal to a value of two for monostatic (reflection) measurements. This results in the nonuniform sampling of the image spectrum, $D(k_x, k_y, k_z)$ 320, along $k_z$.

Finally, a 1-D inverse Fourier transform over range (z) 325 is performed, resulting in the partially processed image $S(k_x, k_y, z)$ 330. Next, a 2-D inverse fast Fourier transform (FFT) over the spatial/cross-range coordinates (x,y) 335 results in a high-resolution volumetric image, s(x,y,z) 340. To be able to use the FFT along the range and consequently speed up SAR image formation, typical implementations use Stolt interpolation (i.e., linear, spline, and the like) to generate a uniform sampling of the spectrum along the range prior to the 1-D inverse Fast Fourier transform 325. However, in an embodiment, the Stolt interpolation may be replaced by the nonuniform FFT (NUFFT) to provide a faster and more accurate SAR image 345. More specifically, the 1-D inverse adjoint NUFFT (INUFFT$^H$) is used such that: ($^H$) represents the adjoint. Thus, the 1-D INUFFT$^H$ transforms nonuniform frequency to uniform spatial samples.

The spatial resolution ($\delta_x$) of the final SAR image is highly dependent upon the imaging system. Particularly, the SAR image is dependent upon aperture size (a), the beamwidth ($\sigma_b$), the distance from the target to the aperture (h), and the sampling of the scattered field.

Figure 4:
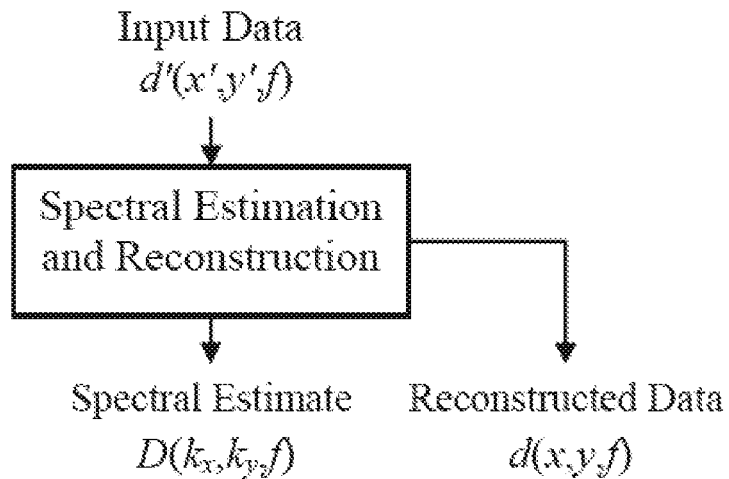
FIG. 4 is a block diagram illustrating the essential requirements of an acceptable spectral estimation method in accordance with one embodiment of the invention.

FIG. 4 illustrates that any spectral estimation (e.g., signal reconstruction) method used 400 should spatially reconstruct the data 405 on a highly sampled uniform grid (x,y) for every frequency (f) 410 and simultaneously provide a high-density spectral estimation 415. The uniform sampling density of the reconstructed data is the same as the final SAR image (i.e., $\Delta x = \Delta y \ll \lambda$). Two methods will be described below. The first method (RT2) is useful for real-time image formation, which is faster than the second method (PP1). In contrast, the second method (PP1) is useful for off-line processing and has an increased accuracy over the first method (RT2).

For example, the first method (RT2) is a Fourier integration, which is a fast rudimentary (e.g., direct) spectral estimation technique and not a reconstruction technique. Each sample may optionally be weighted according to the partial area of the sample on the aperture. The partial area corresponding to every sample may be found from the polygons of a Voronoi diagram. Polygons exceeding the aperture are cropped precisely to the aperture. The data (d') is sampled discretely and nonuniformly at $N_{xy}$ points weighted by this partial area, $a_n$, when performing the nonuniform discrete Fourier transform (NDFT). In summation form the equation may be expressed as:

$$D(k_x, k_y, f) = \sum_{n=1}^{N_{xy}} d'(x'_n, y'_n, f) a_n e^{-j(x'_n k_x + y'_n k_y)} \quad (2)$$

This summation operation may be performed rapidly and accurately by using the computationally efficient 2-D NUFFT$^H$ to transform nonuniform spatial samples to a uniformly sampled spatial spectrum. The algorithm is faster without computing the partial weights. For this reason, this method may be desired for real-time applications. Unfortunately, the spectral estimation degrades rapidly for low sample densities because the spectral estimation is only bounded to $|k_x| \leq \pi/\Delta x$ and $|k_y| \leq \pi/\Delta y$ (i.e., a spectrum not sufficiently bounded). This may result in high levels of image artifacts. However, the resolution of the SAR image does not degrade for the same reason. Therefore, in practice some real-time imaging systems may benefit from this method by preserving the resolution and computational speed at the cost of increasing image artifacts.

Figure 5:
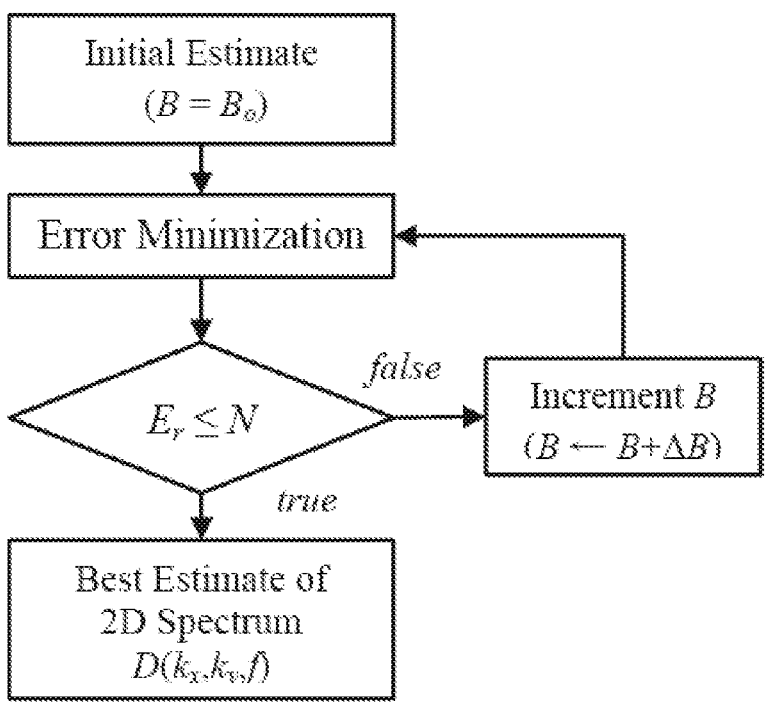
FIG. 5 is a block diagram illustrating the error-minimization method used in accordance with one embodiment of the invention.

FIG. 5 illustrates an outline of the algorithm for the second method, which is named a multi-level error minimization (ML-EM) algorithm (e.g., PP1). The second method is based on a multi-level conjugate gradient (CG) error minimization using the conjugate gradient of the normal equations (CGNE) and is more accurate than the first method. It should be noted that error minimization is merely one of many objectives for reconstruction, included here for purposes of illustration only. In other embodiments, other error minimization methods could also be used (e.g., steepest-descent, Landweber, conjugate gradient residual minimization and the like). Therefore, the ML-EM algorithm is a Fourier-based regularization technique that uses the 2-D spatial bandwidth (B) as the regularization parameter in search of the best reconstruction and spectral estimate of d'(x',y',f) for every f. As such, the ML-EM algorithm begins with an initial estimate of the spatial bandwidth ($B_o$) 500 and minimizes the error (or residual difference) between the forward NDFT and adjoint/inverse NDFT according to CGNE in the inner loop labeled "Error Minimization" 505. The residual originates from the fact that Fourier transforms of nonuniformly spaced data are not simply invertible with an inverse Fourier transform. Thus, the residual, r, may be defined as:

$$r(x',y',f) = d'(x',y',f) - \text{INDFT}_{2D}\{D(k_x,k_y,f)\}, \quad (3)$$

where INDFT is the inverse NDFT and D is the low-pass filtered spectrum of the measured data (d'):

$$D(k_x,k_y,f) = \text{NDFT}_{2D}\{d'(x',y',f)\} \cdot F_B(k_x,k_y), \quad (4)$$

and where $F_B$ is a rectangular low-pass filter with spatial bandwidth (2B):

$$F_B(k_x, k_y) = \begin{cases} 1 & -B \le (k_x, k_y) \le B \\ 0 & \text{otherwise} \end{cases} \quad (5)$$

However, this filter may take any shape the user requires (i.e., circular, etc.). The NDFT transforms may be accelerated if the 2-D NDFT becomes the 2-D $\text{NUFFT}^H$ and the 2-D INDFT becomes the 2-D INUFFT. The error of the minimization process may be represented as the normalized energy of the residual:

$$E_r = \sqrt{\sum_{n=1}^{N_{xy}} \sum_{f \in f} |r(x'_n, y'_n, f)|^2 \Big/ \sum_{n=1}^{N_{xy}} \sum_{f \in f} |d'(x'_n, y'_n, f)|^2} \quad (6)$$

Referring now to the inner loop of FIG. 5, CGNE reduces $E_r$ iteratively until, as the $E_r/N$ block 507 demonstrates, either $E_r$ is less than the noise (N) or the relative difference in $E_r$ between successive iterations is below a prescribed tolerance level (e.g., $10^{-3}$ dB). The estimate of the spectrum after "Error Minimization" is highly dependent upon the regularization parameter (B) 510. If B 510 is smaller than the actual spatial bandwidth of the measurement, the error minimization step cannot achieve $E_r$ lower than the noise because vital information is excluded in the low-pass filter. In effect, the error minimization is similar to a 2-D sinc interpolation to reconstruct the data with excessively wide sinc functions (e.g., B is too small). However, if B is large then the error minimization step terminates quickly with sufficiently low $E_r$. However, the reconstruction is performed with sinc functions that are too narrow. Therefore, B should intentionally be initialized to a minimum value so that B may be slowly incremented by ΔB in the outer loop until the best value for B is determined. The increment ΔB was chosen as the sample spacing of the uniform 2-D spectrum ($2\pi/a_x$). Finally, the process terminates when $E_r$ is below N, and the result obtained corresponds to the best possible estimate of the 2-D spectrum (D) 515. The reconstruction of the data onto uniform samples is the inverse 2-D FFT (IFFT) of D.

Because the accurate method is highly sensitive to the initial estimate of the spatial bandwidth ($B_o$), different estimates of the spatial bandwidth may be used. If one uses a $B_o$ that is too large, it can be seen that if $B_o$ is greater than $\pi/\delta_x$ that the minimization problem is underdetermined (i.e., the error minimization will terminate quickly), and reconstruction artifacts may result. Therefore, it is of paramount importance to choose the best $B_o$.

The sampled signal contains information from all scatterers in the scanning area. Scatterers are located at different coordinates. Therefore, each scatterer has its own distance from the aperture (h) and its own resolution $\delta_x$, which is a strong function of h. Consequently, the spatial bandwidth necessary to accurately represent each scatterer is different. The preceding accurate spectral estimation/signal reconstruction method is formulated optimally for one scatterer in the scanning area, and not multiple scatterers. This is a significant problem because this method must increment only a single spatial bandwidth B until the termination condition is met. If a scanning area consists of scatterers near and far from the aperture, the final bandwidth B to satisfy the termination condition may be too large to correctly reconstruct the signal for the scatterers far from the aperture. In an embodiment, it is preferred to separate the signal contributions from scatterers at different h and then reconstruct that data separately, such that each scatterer has its own spatial bandwidth. Thus, the best signal reconstruction may be performed individually for all scatterers present.

Figure 6:
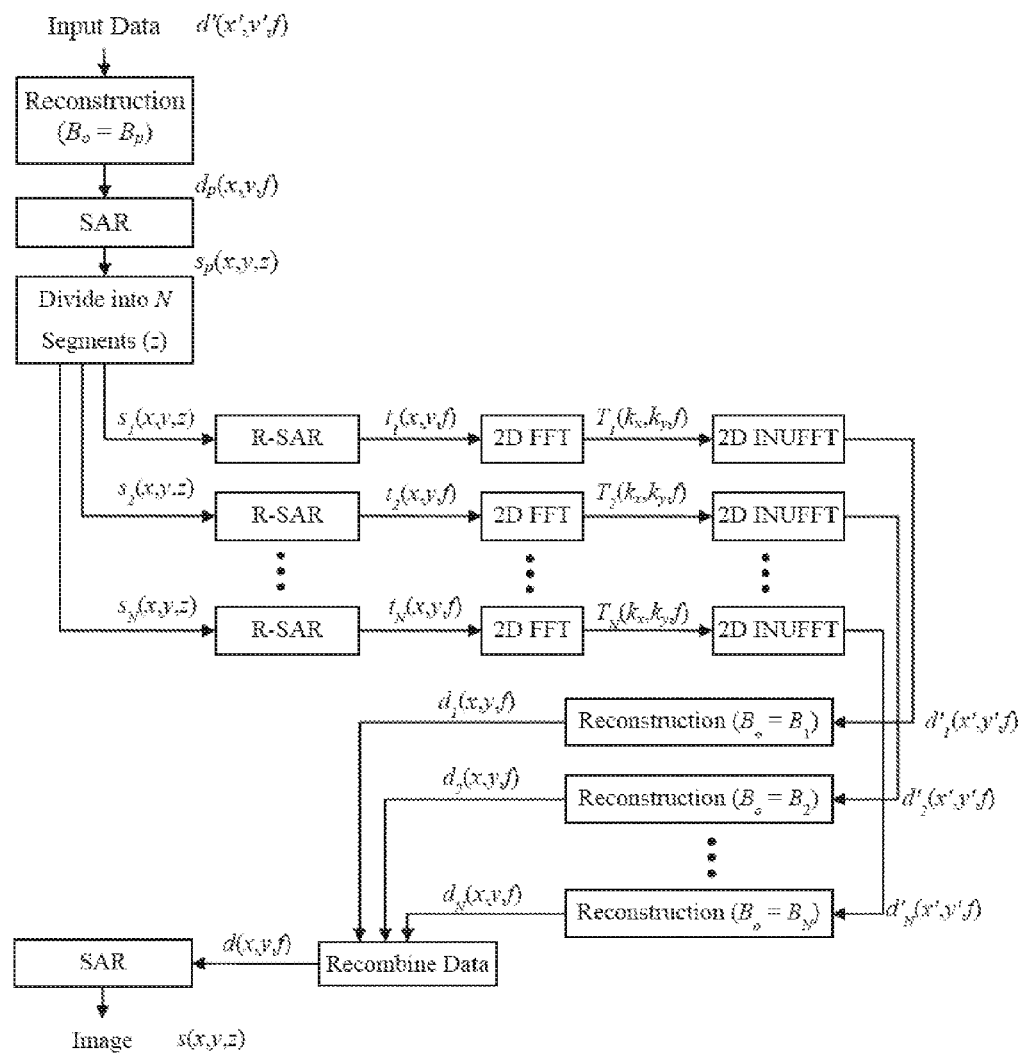
FIG. 6 is a block diagram depicting an offline nonuniform signal reconstruction method used in accordance with one embodiment of the invention.

The following describes the details of a general form of coarse multi-bandwidth reconstruction that finds the best reconstruction for all scatterers within a scanning area of interest from nonuniform samples. FIG. 6 illustrates a procedure that enables the best possible SAR image to be formed using coarse segmentation.

Begin with nonuniform measurement of the scattered fields from scatterers—These measurements are inherently nonuniform and represented by d'(x',y',f) 600 where the primed coordinates indicate measurement samples. They may either be gathered manually as a user moves a probe over the scanning area or they may be gathered automatically (i.e., as an automated system moves a probe along a predetermined path or an array electronically switches between measuring antennas).

Make a preliminary signal reconstruction onto a high-density uniform grid—The current data d'(x',y',f) 600 must be processed to make the intermediate SAR image 605 that we will segment to divide the current data. A bandwidth that preserves the largest spatial frequencies and preserves the best resolution should be utilized. However, the SAR image 605 is only an intermediate image and will contain a high level of image artifacts for scatterers in image segments that are located far from the aperture. The spatial bandwidth of the filter used in the reconstruction process 610 will correspond to the propagating (e.g., non-attenuating) plane waves that are described by the spectrum $D_p(k_x,k_y,f)$. Thus, the filter should be circular and is defined for every frequency, f, such that:

$$F_B(k_x, k_y) = \begin{cases} 1 & -B_p \le \sqrt{k_x^2 + k_y^2} \\ 0 & \text{otherwise} \end{cases} \quad (7)$$

where $B_p = 2\alpha\pi f/v$.

Form a SAR image of the scene from the preliminary signal reconstruction—The spectrum $D_p(k_x,k_y,f)$ corresponds to the highly sampled reconstructed data $d_p(x,y,f)$ 615. This reconstructed data is then passed through a SAR processor to obtain the intermediate SAR image $s_p(x,y,z)$ 620. This SAR image is computed from $-Z_{max}$ to $+Z_{max}$, however, the choice of $Z_{max}$ must be chosen to facilitate the R-SAR transform 625. A detailed description of the R-SAR transform 625 is described below. This SAR image 620 will have greater image artifacts for z values far from the aperture.

Divide the SAR image into segmented ranges—The SAR image $s_p(x,y,z)$ 620 is now divided into N segments 630. The segmentation is performed along the z axis; however, segmentation may also be performed automatically to extract individual scatterers (e.g., watershed segmentation). The thickness of the segments 630 may be chosen arbitrarily by the user, however, it is useful to divide the image according to the expected range resolution $\delta_z$, where:

$$\delta_z = \frac{v}{2(f_{max} - f_{min})}. \tag{8}$$

Thus, $$N \approx Z_{max}/\delta_z. \tag{9}$$

Consequently, segment 1 ($s_1$) 635 is bounded between $-\delta_z \leq z \leq \delta_z$, segment 2 ($s_2$) 640 is bounded between $-2\delta_z \leq z \leq -\delta_z$ and $\delta_z \leq z \leq 2\delta_z$, segment 3 ($s_3$) is bounded between $-3\delta_z \leq z \leq -2\delta_z$ and $2\delta_z \leq z \leq 3\delta_z$, etc. Thus, this type of segmentation is referred to as being coarse.

Perform a highly accurate and fast 3-D Reverse SAR (R-SAR) for each segmented range—All segments 630 of the SAR image 605 correspond to their own reflection data. Thus, the R-SAR transform 625 may be applied to each segment index s 630 where partial data $t_s$ 645 is a result of the R-SAR transform 625 of $s_s$ $$t_s(x,y,f) = \text{R-SAR}\{s_s(x,y,z)\}. \tag{10}$$

However, the R-SAR transform 625 as defined retrieves the data at the high sampling density $t_s(x,y,f)$ 645. This must be transformed back to the original nonuniform sample locations $d'_s(x',y',f)$ 650 to facilitate another reconstruction attempt 655. To accomplish another reconstruction 655, one must first realize that $t_s(x,y,f)$ 645 and $d'_s(x',y',f)$ 650 have the same spectrum. Therefore, the spectrum 665 may be calculated by using the 2-D FFT 660:

$$T_s(k_x,k_y,f) = \text{FFT}_{2D}\{t_s(x,y,f)\}. \tag{11}$$

Consequently, the uniform spectrum can be sampled again onto the nonuniform original sample locations by using the NUFFT that maps uniform samples onto a nonuniform spectrum, which is in contrast to the $\text{NUFFT}^H$ that maps nonuniform samples onto a uniform spectrum. Consequently the inverse nonuniform FFT (INUFFT) 670 of the spectrum 665 yields the original nonuniform sample locations $d'_s(x',y',f)$ 650 as:

$$d'_s(x',y',f) = \text{INUFFT}_{2D}\{T_s(k_x,k_y,f)\}. \tag{12}$$

Make another signal reconstruction for each segmented range and sum these—Now that the measured data 650 for every segment has been retrieved, the best signal reconstruction possible for every segment is determined. This is done by utilizing the rectangular filter described above and setting the initial spatial bandwidth 655, $B_o = B_s$ where $$B_s = \frac{\pi}{\delta_x \left(h = \left(s - \frac{1}{2}\right)\delta_z\right)}. \tag{13}$$

After this reconstruction process is complete for all segments 675, the data of the segments may be summed 680 to the final reconstructed data 685:

$$d(x,y,f) = \sum_{s=1}^{N} d_s(x,y,f). \tag{14}$$

Make final SAR image—high quality, highly accurate, with minimal image artifacts—At last, the final SAR image 690 may be computed from this reconstructed data 685:

$$s(x,y,z) = \text{SAR}\{d(x,y,f)\} \tag{15}$$

This results in a SAR image 690 with the least amount of image artifacts and is the best SAR image obtainable because the reconstruction of the data 655 has been optimized for each range segment 675.

The SAR and R-SAR (reverse SAR) algorithms form a transform pair, which enables the separation of data for scatterers located in different range segments. The SAR and R-SAR algorithms may also be used in compressive sensing (CS) techniques to recover the image from under-sampled data and enforce the measurement constraint.

Figure 7:
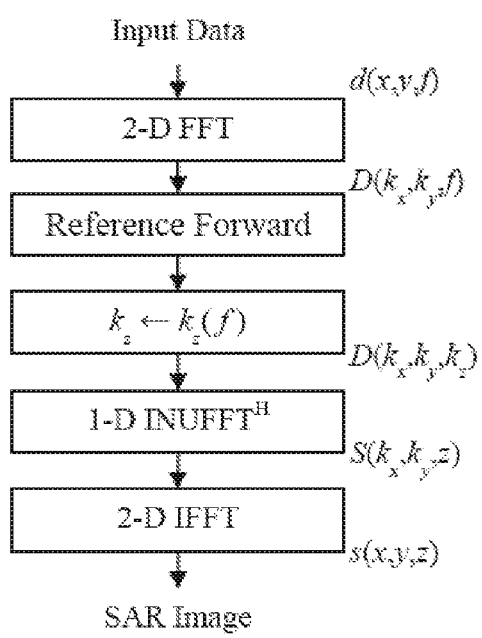
FIG. 7 depicts block diagrams of synthetic aperture radar algorithms used in another error minimization process of an offline nonuniform signal reconstruction method in accordance with one embodiment of the invention.
Figure 7:
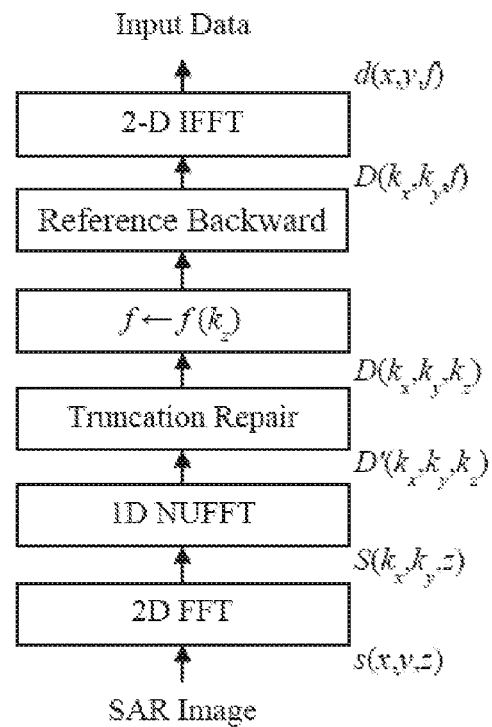

The ω-k SAR algorithm is used to compute the wideband 3-D SAR images. The SAR algorithm is formulated to use the NUFFT, which as mentioned above, is a fast and accurate approximation to the NDFT. FIG. 7 shows the forward 700 and reverse 705 SAR transforms side by side where the SAR transform 700 is illustrated on the left and the R-SAR transform 705 is illustrated on the right. The following expression assumes that the nonuniform data has previously been reconstructed onto a highly sampled grid because the input data 710 is uniform data $d(x,y,f)$ 715 and not nonuniform data $d(x',y',f)$. The SAR algorithm 700 for a homogeneous medium can be formulated as:

$$s(x,y,z) = \tag{16}$$

$$\text{IFFT}_{2D}\left\{\text{INUFFT}_{1D}^{H}\left\{\begin{array}{c}\text{FFT}_{2D}\{d(x,y,f)\} \cdot \\ \exp\left(-jz_0\sqrt{\left(\frac{2\alpha\pi f}{v}\right)^2 - k_x^2 - k_y^2}\right)\end{array}\right\}\right\},$$

where equation (16) is the mathematical form of FIG. 3, a SAR ω-k algorithm with a 1-D NUFFT. Inside equation (16) is the implicit dispersion relation:

$$k_z = \sqrt{\left(\frac{2\alpha\pi f}{v}\right)^2 - k_x^2 - k_y^2}, \tag{17}$$

where v is the speed of light in the medium that is imaged with dielectric constant $\in_r$, where $$v = \frac{c}{\sqrt{\varepsilon_r}}. \tag{18}$$

The variable $z_0$ is the shift along the Z direction from the aperture to the top of the medium of interest. This is labeled in FIG. 7 as "Reference Forward" 720 in the SAR transform. Thus, the exponential term containing $z_0$ is simply the propagation of the spectral decomposition through the first medium, and $\bar{v}$ in equation (16) is the speed of light in the first medium. The variable $z_0$ is useful for removing the standoff distance between the aperture and the medium of interest. However, if no shift is required, then in an embodiment one may choose to set $z_0=0$ or $v=\bar{v}$.

The transform as expressed in equation (16) supports propagating through a medium that may or may not have the same properties as the medium being imaged. An obvious restriction is that the boundary between the first and second mediums must be parallel to the aperture. However, strong reflections may occur at the boundary depending upon the relative dielectric contrast between the two media that may mask the scatterers within the medium of interest. To reduce the influence of the boundary on the SAR image, the boundary may be subtracted from the original measurement $d(x,y,f)$ 715. Given a particular frequency of operation $f_m$, the reflection from the dielectric boundary is contained in the measurements $d(x,y,f_m)$. Because the boundary is parallel to the aperture, the reflection from the dielectric boundary does not change as a function of location $(x,y)$. Therefore, an estimate of the data $\hat{d}(x,y,f_m)$ without the reflection from the dielectric boundary can be found by subtracting the mean of $d(x,y,f_m)$:

$$\hat{d}(x,y,f_m) = d(x,y,f_m) - E[d(x,y,f_m)] \forall m \in \{1,2,\ldots,N_f\}, \tag{19}$$

where $E[.]$ is the expectation operator.

R-SAR algorithms have been described in the art. However, the R-SAR algorithm here 705 is unique because it is a 3-D, robust, and highly accurate algorithm. The R-SAR algorithm 705 is similar to SAR algorithm 700 except the R-SAR algorithm 705 is backward and contains an additional repair step (e.g., "Truncation Repair" 725), which corrects for the Fourier truncation that occurred in the SAR algorithm by the Fourier transform 730 from $k_z$ to z. Truncation occurs because the SAR image 710 cannot be computed for an infinite range of z and because the SAR image 710 is nonperiodic, which is a result of dispersion relation of equation (17) that generates nonuniform samples of $k_z$. Uncorrected, the truncation error is the largest source of error when computing R-SAR.

"Truncation Repair" 725 quickly and accurately deconvolves the effect of the truncation along z from the estimate of the spectrum in $k_z$ 735. Because truncation error occurs only for the 1-D Fourier transforms, the nomenclature can be simplified from $S(k_x,k_y,z)$ 740 to $S(z)$, which is sampled at $N_z$ uniform locations $z_n$ and may be vectorized as S. (S is used to simplify the following mathematical expressions). The uniform image step size $\Delta z$ is chosen to be less than or equal to the range resolution $\delta_z$ such that:

$$\delta_z = \frac{v}{2(f_{max} - f_{min})} \tag{20}$$

for the range $-R_{max} \leq z_n \leq R_{max}$, where $R_{max}$ is the maximum unambiguous range for the propagating wave along the Z axis from the measurement plane and is defined as:

$$R_{max} = \frac{v}{4\pi\Delta f}, \tag{21}$$

where $\Delta f$ is the frequency step size. Similarly, reduce $D(k_x, k_y, k_z)$ 745 notation to continuous function $D(k_z)$:

$$D(k_z) = \sum_{m=1}^{N_f} D_m \delta(k_z - k_{zm}), \tag{22}$$

which is sampled at $N_f$ nonuniform samples located at $k_{zm}$ with the values as vectorized by F where $\delta(.)$ is the continuous Dirac delta function. Furthermore, if $D(k_z)$ may be the 1-D discrete time Fourier transform (DTFT) of S, and if S could extend from $-\infty$ to $+\infty$, we have $$S = \text{IDTFT}_{1D}\{D(k_z)\} \tag{23}$$

and $$D(k_z) = \text{DTFT}_{1D}\{S\}, \tag{24}$$

where IDTFT is the inverse DTFT. However, as stated before, the SAR image cannot be computed for an infinite range. Therefore, only the spectrum from the truncated SAR image 735 is available:

$$D'(k_z) = \text{DTFT}_{1D}\{\hat{m} \cdot S\}, \tag{25}$$

where the prime notation represents the spectral estimate after truncation 745 and the truncation 725 (i.e., window function or masking function) is represented as:

$$\hat{m}_n = \begin{cases} 1 & -\frac{N_z}{2} \leq n \leq \frac{N_z}{2} \\ 0 & \text{otherwise.} \end{cases} \tag{26}$$

Knowing that multiplication in the z domain is equivalent to convolution in the $k_z$ domain, the following relationship holds:

$$\hat{m} \cdot S \xrightarrow{\text{DTFT}_{1D}} \hat{M}(k_z) * D(k_z) = D'(k_z), \tag{27}$$

where * denotes convolution operation and $\hat{M}(k_z)$ is the corresponding spectrum to $\hat{m}$ given as:

$$\hat{M}(k_z) = \sum_{n=-\infty}^{\infty} \hat{m}_n e^{-jn\Delta z k_z} = \frac{\sin(\Delta z k_z (N_z + 1)/2)}{\sin(\Delta z k_z / 2)}. \tag{28}$$

The difference between $D(k_z)$ 745 and $D'(k_z)$ 735 is the truncation error, and the truncation error may be reduced by using known error minimization methods. However, these error minimization methods are computationally complex compared to simply solving for the truncation error by deconvolving $\hat{M}(k_z)$ from $D'(k_z)$. One consequence of this deconvolution is that information at any frequency (f or $k_z$) is independent of all other frequencies.

To deconvolve the effect of truncation efficiently, one may formulate the convolution in equation (27) in matrix form $$D' = \hat{M} D \quad (29)$$

such that $$\hat{M} = \begin{bmatrix} \hat{M}_{11} & \hat{M}_{12} & \cdots & \hat{M}_{1,N_f} \\ \hat{M}_{21} & \hat{M}_{22} & \cdots & \hat{M}_{2,N_f} \\ \vdots & \vdots & \ddots & \vdots \\ \hat{M}_{N_f,1} & \hat{M}_{N_f,2} & \cdots & \hat{M}_{N_f,N_f} \end{bmatrix} \quad (30)$$

where for some row r and column c $$\hat{M}_{rc} = \hat{M}(k_{zr} - k_{zc}). \quad (31)$$

If $\hat{M}$ is invertible, the original signal D 745 can be recovered exactly by deconvolving the spectrum representation of the window function 735:

$$D = \hat{M}^{-1} D', \quad (32)$$

which is referred to as "Truncation Repair" in FIG. 7. Additionally, $\hat{M}^{-1}$ may be stored for all combinations of $(k_x, k_y)$ and used for later reprocessing if necessary. This is practical because the number of frequencies, $N_f$, is usually much smaller than $N_z$ for NDE applications. Therefore, R-SAR 705 as implemented here can be performed both quickly and accurately. Finally, the R-SAR transform 705 can then be formulated as $$d(x, y, f) = IFFT_{2D} \left\{ \begin{array}{l} T\{NUFFT_{1D}\{FFT_{2D}\{s(x, y, z)\}\}\} \cdot \\ \exp\left(jz_0 \sqrt{\left(\frac{2\alpha\pi f}{v}\right)^2 - k_x^2 - k_y^2}\right) \end{array} \right\}, \quad (33)$$

where $T\{.\}$ is the truncation repair as implemented in equation (32).

The R-SAR transform 705 can only be performed successfully if $\hat{M}^{-1}$ exists and if the following three requirements are met: (a) frequencies of measurement must be known, (b) support functions cannot overlap, and (c) sampling of SAR image along z must satisfy the Nyquist rate. Each of the three requirements are discussed further below.

Frequencies of measurement must be known—The frequencies f used in the measurement $d(x,y,f)$ 715 must be known so that the contributions of these frequencies in the SAR image 710 $s(x,y,z)$ 750 can be determined. This is in contrast to the more general problem for which the frequencies of the system may be unknown. Therefore, the SAR imaging system must be well defined so that SAR 700 and R-SAR 705 algorithms form an accurate transform pair.

Support functions cannot overlap—The main lobes of the function $\hat{M}(k_z)$ in equation (28) referred to by $\hat{M}_{rc}$ in equation (31) must not overlap. Given that $$\Delta k_z = \frac{2\alpha\pi \Delta f}{v} \quad (34)$$

and $$Z_{max} - Z_{min} = \Delta z N_z \quad (35)$$

it can be shown that the following condition must be met $$Z_{max} - Z_{min} \geq \frac{v}{2\Delta f} = 2R_{max}. \quad (36)$$

where $R^{max}$ is defined in equation (21).

$$\Delta z \leq \frac{\delta_z}{2} = \frac{v}{4(f_{max} - f_{min})}. \quad (37)$$

Sampling of the SAR image to satisfy the Nyquist rate prevents the occurrence of aliasing error in the 1-D NUFFT 730 of the R-SAR transform 705.

As discussed earlier, the accurate NUFFT-based SAR/R-SAR transform pair can be used to accurately separate contributions of scatterers in the measured data. Further, if the truncation error is not repaired, iterations of the SAR 700 and R-SAR 705 algorithms will diverge due to the cumulative error.

Figure 8:
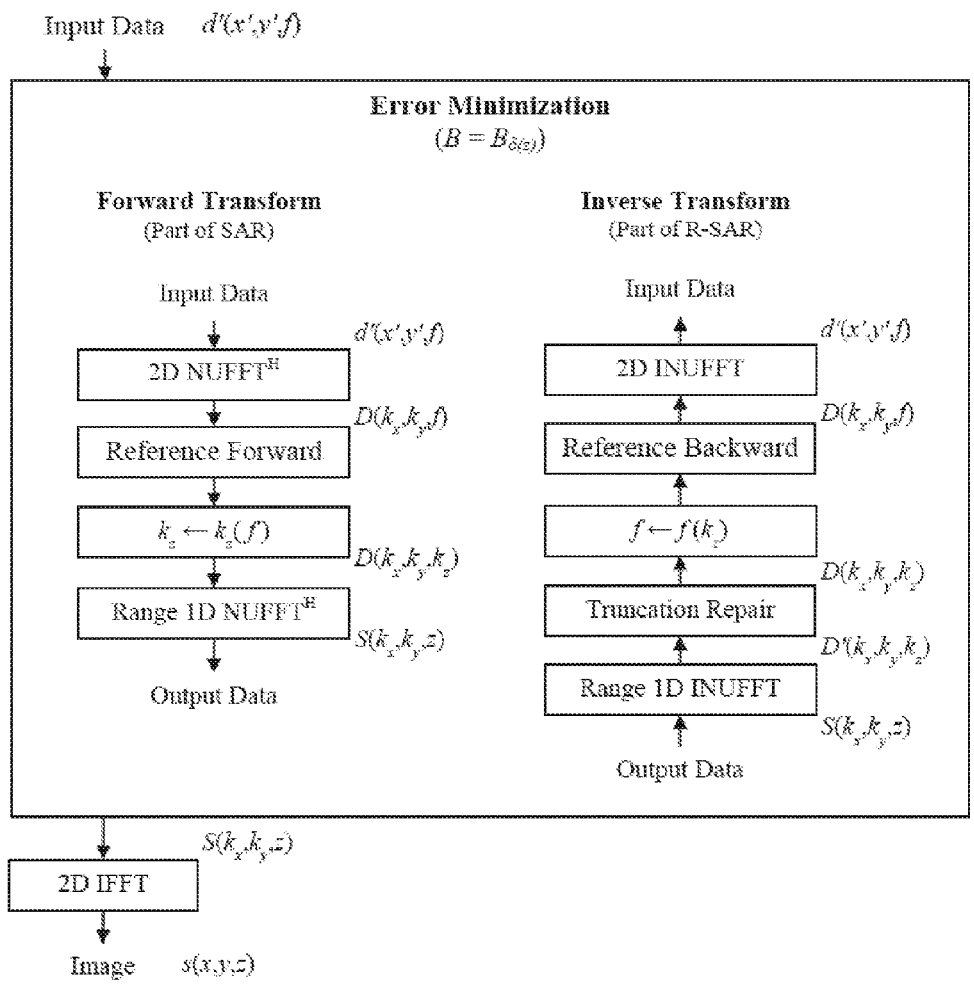
FIG. 8 depicts block diagrams of synthetic aperture radar algorithms used in the error minimization process of an offline nonuniform signal reconstruction method in accordance with one embodiment of the invention.

PP3, fine multi-bandwidth reconstruction, determines the best reconstruction for all scatterers within a scene of interest from nonuniform samples, and PP3 is similar to PP2. In an embodiment, PP3 can consist of a coarse filter along z that can obtain identical results to PP2. However, SAR and R-SAR have been combined into the error minimization process, which is illustrated in FIG. 8, which effectively results in a fine segmentation along z. As such, the intermediate SAR image is not computed and need not be coarsely segmented, which significantly decreases computational complexity. This is useful for images that cannot or should not be segmented coarsely (i.e., images of a scanning area containing many scatterers). Previously, the error minimization process sought the minimum error (or minimum residual) between the 2-D NUFFT$^H$ 800 and the inverse 2-D NUFFT (2D INUFFT) 805. Now, the error minimization process seeks the minimum error between two different Fourier-based transforms; one that has been used to transform nonuniform measurements $d'(x',y',f)$ 810 to the 3-D SAR image spectrum $S(k_x,k_y,z)$ 815 and another which is used to transform the 3-D SAR image spectrum $S(k_x,k_y,z)$ 820 to nonuniform measurements $d'(x',y',f)$ 825. To compare with PP2, the segmentation for PP3 is for every sample along z, and every sample of z has its own partial data and filter bandwidth during reconstruction.

FIG. 8 illustrates a schematic of PP3. The forward Fourier-based transform 830 utilizes components of the forward SAR transform, where the last step of performing a 2-D IFFT is removed. The inverse Fourier-based transform 835 utilizes components of the R-SAR transform, where only the first 2-D FFT is removed in the end of the process. Using these new transforms, the error minimization process 840 may be executed nearly identically to PP2. The process is not multi-level, however, one may easily adapt this error minimization to a multi-level process so that the bandwidth is incremented in an outer loop. The 2-D filter $B = B_{67 \ (z)}$ applies the filter $|k_x| \leq \pi/\delta(z)$ and $|k_y| \pi/\delta(z)$ for the spatial theoretical resolution $\delta(z)$ along $S(k_x,k_y,z)$. Upon completion of the error minimization process, the 2-D spectrum of the image $S(k_x,k_y,z)$ 840 is provided. A high-resolution and high-quality SAR image 845 results after the final 2-D IFFT 850 is applied to the image $S(k_x,k_y,z)$ 840.

The following demonstrates exemplary performance of the algorithms using simulated data. A square aperture size with aperture dimensions $a_x = a_y = 10\lambda$ was used consisting of antennas with Gaussian half-power beamwidth of 120-degrees. These antennas measured the complex reflection coefficient for 31 uniformly sampled frequencies in Ku-Band (e.g., 12.4-18 GHz). The measuring locations were selected randomly but not independently such that a minimum distance ($\Delta_m$) between antennas was maintained. For $N_{xy}$ nonuniform measurement locations, this resulted in an average sample density of $\Delta$, where:

$$\Delta = \sqrt{a_x a_y / N_{xy}}. \tag{38}$$

Three different $\Delta_m$ were selected to show the performance of the algorithm for different sampling (0.3, 0.5, and 0.7*$\lambda$). Six point scatterers were placed in the scene to ideally scatter signal back to the aperture for distances 2.5, 5, 7.5, 10, 12.5, and 15-$\lambda$. White Gaussian noise was injected into the nonuniform measurements to correspond to a signal-to-noise ratio (SNR) of 30 dB. The simulation was set up such that each scatterer had the same scattering coefficient. Consequently, the scattered signal attenuates as a function of distance (e.g., distant scatterers are weaker).

The same nonuniform data was processed into SAR images in multiple ways: (1) no reconstruction –RT2, (2) reconstruction using range segments with smooth transitions and thickness equal to the range resolution ($\delta_z$)–PP2, and (3) reconstruction using the modified error minimization method –PP3. These were compared not only to each other but also to an image formed from noiseless, high-density measurements. To render images so they are easy to interpret, the images were auto-scaled as a function of z to make all scatterers appear with the same brightness. Therefore, the image of more distant objects appears noisy as the scattered signal drops to the level of the noise or the error remaining after reconstruction.

Figure 9:
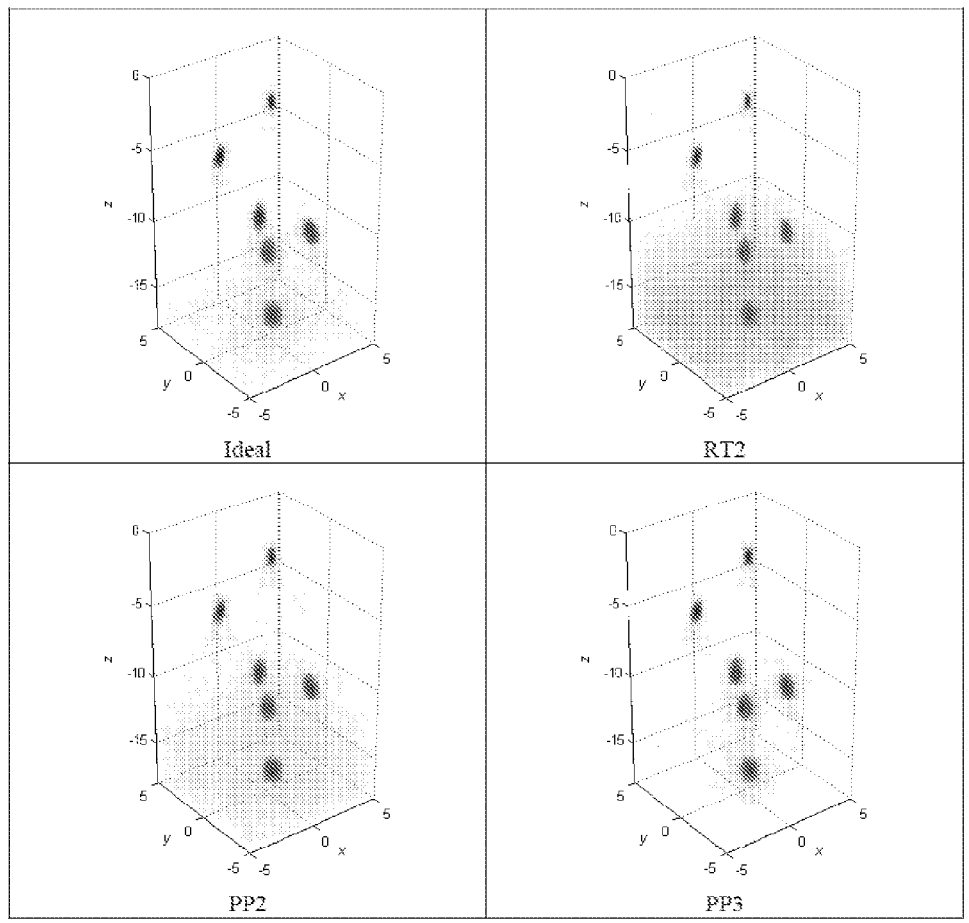
FIG. 9 depicts the results of several synthetic aperture radar reconstruction methods, at an average given distance between antennas of $0.3*\lambda$.

FIG. 9 illustrates the results for the $\Delta_m = 0.3\lambda$. This corresponds to a measurement made with only 44% of the measurements required as determined by the proper sampling of $\lambda/4$. The ideal image 900 shows the six scatterers 905 in their proper locations and some noise-like artifacts 910 appear on the bottom of the ideal image 900. These artifacts 910 originate from the numerical noise (rounding errors) competing with the relatively low signal strength of the farthest scatterers 905. The image from RT2 915 shows a large level of artifacts 920 on the bottom of the image 915, which is partly due to noise but mostly due to the lack of any reconstruction. PP2 reconstruction 925 shows that the artifacts 930 can be greatly reduced thereby allowing a better view of the scatterers 935. PP3 reconstruction 940 reduces these artifacts 945 even more, which shows that a near ideal image may still be formed from under-sampled measurements (e.g., 44% of proper sampling).

Figure 10:
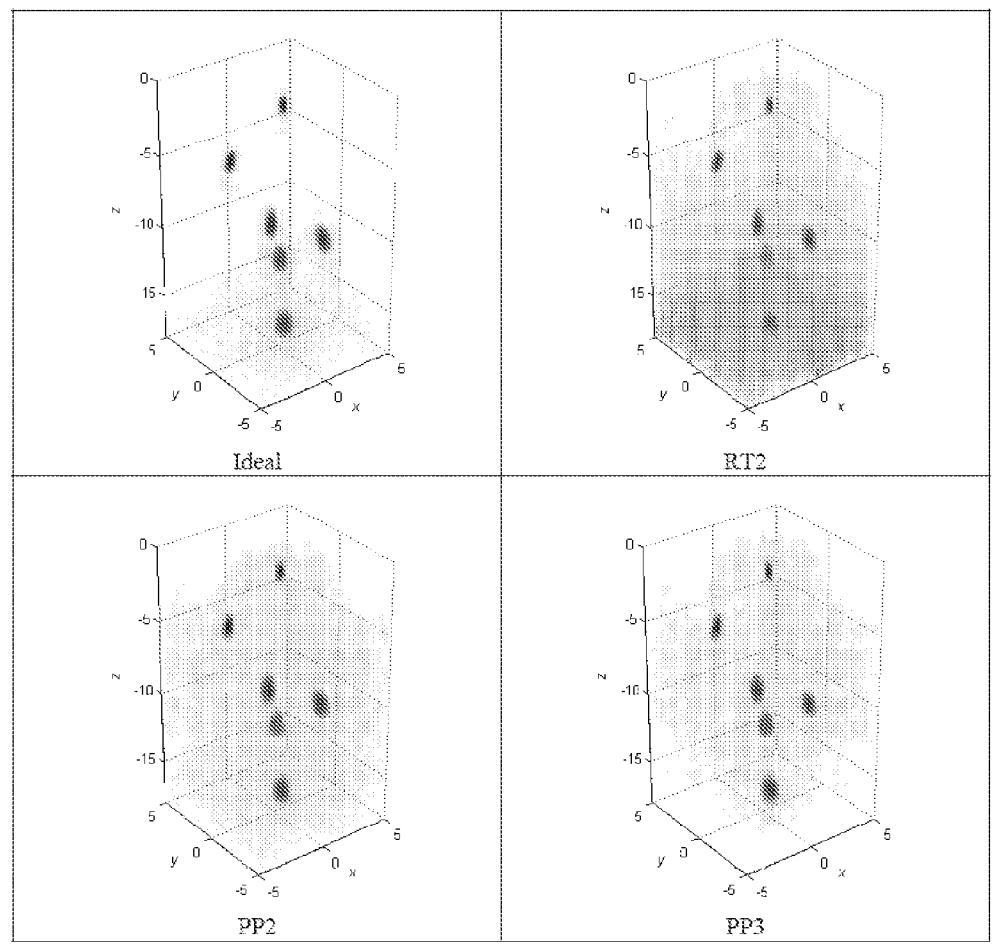
FIG. 10 depicts the results of several synthetic aperture radar reconstruction methods, at an average given distance between antennas of $0.5*\lambda$.
Figure 11:
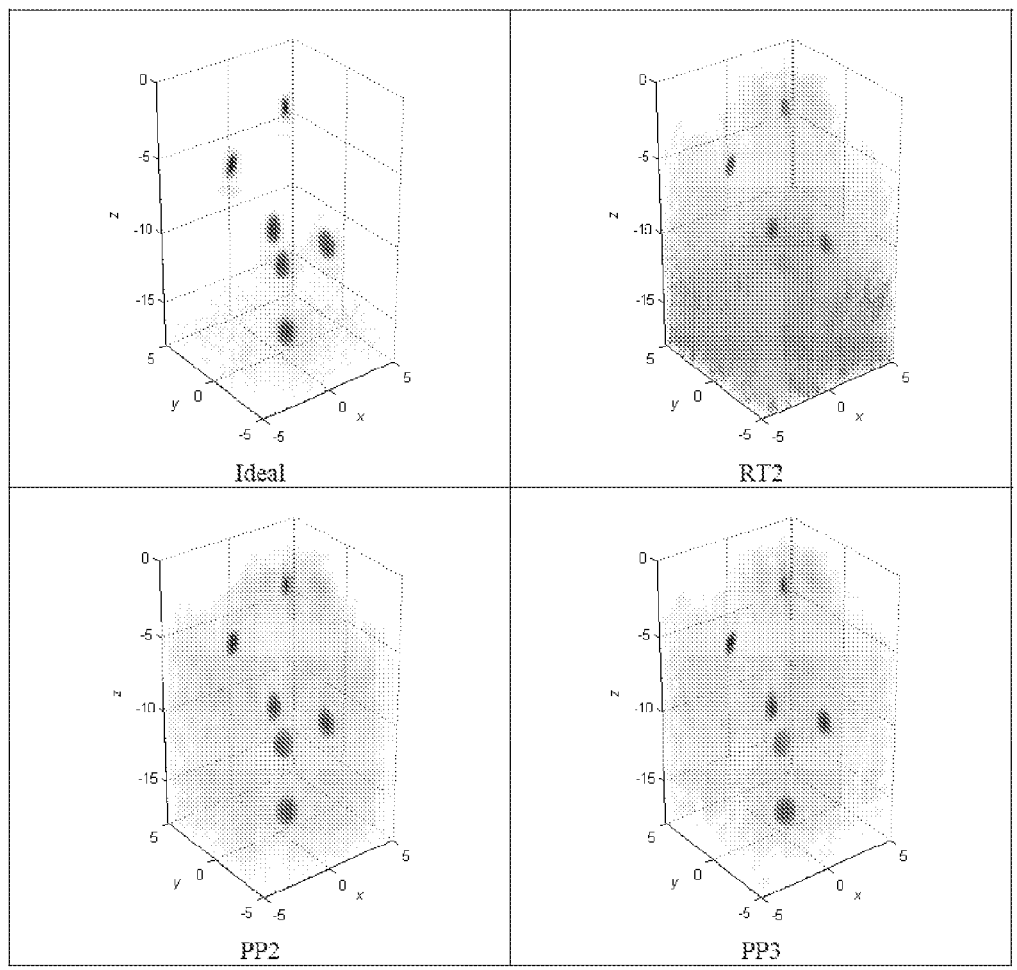
FIG. 11 depicts the results of several synthetic aperture radar reconstruction methods, at an average given distance between antennas of $0.7*\lambda$.

Results for $\Delta_m = 0.5\lambda$ (17% of proper sampling) and $\Delta_m = 0.7\lambda$ (8% of proper sampling) are shown in FIGS. 10 and 11, respectively. FIGS. 10 and 11 show that for decreasing sampling density, the images from RT2, PP2, and PP3 have an increasing level of artifacts. The image of RT2 is always the worst because no reconstruction is performed. PP2 and PP3 have an increased level of background artifacts as compared to the ideal image, but the scatterers can still be easily recognized and thresholding or brightness adjustment (not shown) can easily be performed to improve the images further.

The following discussion is intended to provide a brief, general description of a suitable computing environment in which aspects of the invention may be implemented. Although not required, aspects of the invention are described in the general context of computer-executable instructions, such as program modules which perform particular tasks or implement particular abstract data types, being executed by computers in network environments or in distributed computing environments.

Those skilled in the art will appreciate that aspects of the invention may be practiced in network computing environments with many types of computer system configurations (like personal computers, tablets, mobile or hand-held devices, or multi-processor systems). Aspects of the invention may also be practiced in distributed computing environments, where tasks are performed by local and remote processing devices linked through a communications network. Examples of devices used in a distributed computing environment include program modules located in both local and remote memory storage devices.

An exemplary system for implementing aspects of the invention includes a general purpose computing device consisting of various system components including the system memory. The system memory includes random access memory (RAM) and read only memory (ROM).

The computing device may also include a magnetic hard disk drive for reading from and writing to a magnetic hard disk or a removable magnetic disk, or an optical disk drive for reading from or writing to a removable optical disk such as a CD-ROM or other optical media. These disk drives are connected to the system bus by specific interfaces. The drives and their associated computer-readable media provide nonvolatile storage of data for the computer. The exemplary environment described herein employs a magnetic hard disk, a removable magnetic disk, and a removable optical disk, but other types of computer readable media for storing data can be used.

Program code means comprising one or more program modules may be stored on the computer readable media storage previously mentioned. Various means of user input as well as various display devices are typically included. In an embodiment, the SAR images can be displayed in real-time on the monitor.

The computer may operate in a networked environment, which may include another personal computer or another common network node including many or all of the elements described above relative to the computer. Networking environments may connect computers locally (through a network interface) or wirelessly (through a modem, wireless link, or other means).

Preferably, computer-executable instructions stored in a memory, such as the hard disk drive, and executed by computer embody the illustrated processes.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention. In addition, it is contemplated that the Fourier references mentioned throughout this document are in one embodiment a nonuniform discrete Fourier Transform (NDFT), but may also include other Fourier methodologies as known to one skilled in the art to approximate the NDFT.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A wideband synthetic aperture radar (SAR) imaging system, comprising:
    a probe having an aperture through which a signal is transmitted incident to an object located in a medium of interest remotely from the probe and through which a plurality of nonuniformly sampled reflected signals from the object are received by the probe as the probe moves in a measurement plane located a predetermined distance from the object;
    a memory for storing measurement data representative of the reflected signals collected by the probe;
    a processor for executing a plurality of computer-executable instructions for a SAR-based reconstruction algorithm, said instructions comprising:
        instructions for performing a spectral estimation based on the measurement data;
        instructions for transforming a frequency component of the spectral estimation as a function of the medium of interest;
        instructions for obtaining an intermediate three-dimensional SAR image from the transformed spectral estimation data using Fourier transforms;
        instructions for segmenting the intermediate three-dimensional SAR image into a plurality of segments in an image domain, wherein each segment includes a spatial bandwidth of a plurality of spatial bandwidths of the intermediate three-dimensional SAR image;
        instructions for transforming each of the plurality of segments from the image domain to a measurement domain, wherein each of the plurality of segments is represented as partial data;
        instructions for performing an optimization operation on each of the plurality of segments based on a comparison between the partial data thereof and the measurement data;
        instructions for recombining the plurality of segments to produce a final three-dimensional SAR image; and
    a display responsive to the processor for presenting the final three-dimensional SAR image to a user.

2. The imaging system of claim 1, wherein the measurement data is mapped to a densely sampled uniform grid.

3. The imaging system of claim 1, wherein the spectral estimation comprises application of a fast Fourier transform.

4. The imaging system of claim 2, wherein the spectral estimation comprises application of a nonuniform fast Fourier transform.

5. The imaging system of claim 1, wherein the spatial bandwidth of each of the plurality of segments is unique and corresponds to a depth in the intermediate three-dimensional SAR image.

6. The imaging system of claim 1, the instructions for the SAR-based reconstruction algorithm further comprising instructions for performing an optimization operation based on components derived from a SAR-based transform and an R-SAR-based transform.

7. The imaging system of claim 1, wherein the probe is configured to be manually moved in the measurement plane as a scan is performed.

8. The imaging system of claim 1, wherein the signal comprises microwave or millimeter wave electromagnetic energy.

9. The imaging system of claim 1, wherein the signal comprises ultrasonic waves or acoustic energy.

10. The imaging system of claim 1, wherein the probe comprises an open-ended waveguide antenna.

11. The imaging system of claim 1, wherein spectral estimation includes the step of performing a reference shift to align the measurement plane with the top of the medium of interest.

12. A method of generating a three dimensional image of a specimen under test (SUT) comprising:
    transmitting, via a probe, a signal within a predetermined operating bandwidth;
    tracking nonuniform two-dimensional movement of the probe within a measurement plane remote from the SUT;
    receiving, via the probe, signals reflected from the SUT during the movement of the probe;
    storing reflection coefficient data based on the reflected signals as distributed measurement positions within the measurement plane by recording the signals at discrete frequencies throughout the operating bandwidth;
    processing the stored data into a wide band, synthetic aperture image by implementing a synthetic aperture radar (SAR) algorithm;
    displaying the image to a user in real-time;
    further processing the image to perform an optimization objective, wherein the optimization includes reducing the error between components derived from a SAR-based transform and an R-SAR-based transform; and
    further displaying the optimized image to the user.

13. The method of claim 12, wherein the further processing comprises performing spectral estimation on the reflection coefficient data.

14. The method of claim 13, wherein the optimization includes reducing the error between nonuniform input data and an inverse two-dimensional nonuniform fast Fourier transform of the spectral estimation.

15. The method of claim 12, wherein nonuniform points are sampled from the tracked movement, and the points are mapped to a densely sampled uniform grid.

16. The method of claim 12, wherein said processing comprises a two-dimensional fast Fourier transform.

17. The method of claim 16, wherein said two-dimensional fast Fourier transform comprises a nonuniform two-dimensional fast Fourier transform.

18. The method of claim 12, wherein said processing comprises segmenting the image into a plurality of image segments, wherein the image is represented as data corresponding to a plurality of spatial bandwidths, and wherein each image segment is represented as partial data corresponding to a single spatial bandwidth of the plurality of spatial bandwidths.

19. A wideband synthetic aperture radar (SAR) imaging system, comprising:
- a signal source for generating a signal with a predetermined operating bandwidth;
- a transceiver antenna coupled to the signal source, the antenna having an aperture through which the signal is transmitted incident to an object located in a medium and through which a plurality of nonuniformly sampled reflected signals from the object are received by the antenna as the antenna moves nonuniformly in a plane located a predetermined distance from the object;
- a memory for storing signal data, the signal data comprising nonuniformly sampled reflected signals collected at the aperture;
- a processor executing a plurality of computer-executable instructions for a real-time, post-processing, reconstruction algorithm comprising:
  - instructions for estimating a two-dimensional spatial spectrum based on the signal data to provide a uniformly sampled spectrum;
  - instructions for estimating the uniformly sampled spectrum to remove or minimize image artifacts;
  - instructions for reconstructing uniformly sampled data from nonuniformly sampled data to remove or minimize image artifacts;
  - instructions for forming a SAR image of the object from the estimated uniform spectrum;
  - instructions for dividing the reconstructed SAR image into a plurality of segments;
  - instructions for applying a R-SAR transform to each of the segments;
  - instructions for filtering and reconstructing the data for each of the segments and summing each of the filtered segments to create reconstructed data;
  - instructions for applying a SAR transform to the reconstructed data to create a three-dimensional SAR image; and
- a display for presenting the three-dimensional SAR image to a user.

20. The imaging system of claim 19, wherein the transceiver antenna is configured to be manually moved in the plane as a scan is performed.

21. The imaging system of claim 19, wherein the signal source is configured to transmit the signal at a plurality of discrete frequencies in the operating bandwidth.

22. The imaging system of claim 19, wherein nonuniform sampling occurs below a Nyquist sampling rate.

23. The method of claim 12, wherein said transmitting, said tracking, and said receiving comprise a nondestructive evaluation application.

\* \* \* \* \*